United States Patent
Cenzer et al.

(10) Patent No.: US 6,486,580 B1
(45) Date of Patent: Nov. 26, 2002

(54) BEARING RETAINER ASSEMBLY

(75) Inventors: Carl William Cenzer, Brighton, MI (US); Jeanne Marie Schiavone, New Hudson, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/500,810

(22) Filed: Feb. 10, 2000

(51) Int. Cl.[7] .............................. H02K 7/08; H02K 5/00; H02K 13/00
(52) U.S. Cl. ........................... 310/90; 310/89; 310/239; 310/91
(58) Field of Search .......................... 310/90, 239, 89, 310/85, 238, 228, 50, 91

(56) References Cited

U.S. PATENT DOCUMENTS

| | | | |
|---|---|---|---|
| 2,504,776 A | * 4/1950 | Woodfield et al. | 384/535 |
| 3,624,434 A | * 11/1971 | Dafler et al. | 310/239 |
| 3,656,018 A | * 4/1972 | Maher | 310/242 |
| 3,894,254 A | * 7/1975 | Holther, Jr. | 310/50 |
| 4,340,830 A | * 7/1982 | Hoyer-Ellefsen | 310/89 |
| 4,355,253 A | * 10/1982 | Vollbrecht | 310/239 |
| 4,546,280 A | * 10/1985 | Pfuger | 310/68 D |
| 4,673,836 A | 6/1987 | Akiyama et al. | 310/239 |
| 4,705,983 A | 11/1987 | Franz et al. | 310/68 D |
| 4,823,032 A | 4/1989 | Ward et al. | 310/43 |
| 4,847,528 A | 7/1989 | Eguchi et al. | 310/239 |
| 5,059,042 A | * 10/1991 | Grierson | 384/537 |
| 5,128,574 A | * 7/1992 | Koizumi et al. | 310/89 |
| 5,214,337 A | * 5/1993 | Ishibashi | 310/90 |
| 5,723,932 A | 3/1998 | Ito et al. | 310/248 |
| 5,969,450 A | * 10/1999 | Satterfield et al. | 310/90 |
| 5,998,894 A | * 12/1999 | Raad | 310/68 B |
| 6,078,117 A | * 6/2000 | Perrin et al. | 310/68 R |
| 6,097,128 A | * 8/2000 | Ko | 310/239 |
| 6,215,211 B1 | * 4/2001 | Harris et al. | 310/239 |
| 6,270,260 B1 | * 8/2001 | Hale | 384/537 |
| 6,388,351 B1 | * 5/2002 | Fisher et al. | 310/90 |

FOREIGN PATENT DOCUMENTS

JP            62002830 A     *  1/1987     ......... H02K/07/102

* cited by examiner

Primary Examiner—Nestor Ramirez
Assistant Examiner—Guillermo Perez
(74) Attorney, Agent, or Firm—Brinks Hofer Gilson & Lione

(57) ABSTRACT

An alternator assembly 10 has a cover 12 with a brush holder and bearing retainer assembly 14 positioned therein. The brush holder and bearing retainer assembly 14 has a bearing retainer housing 48, a brush holder housing 50 and a cap 52. The bearing retainer housing has a cup-shaped end portion 54 and a brush holder retaining portion 56. The cup-shaped end portion has a liner 78 that is preferably integrally molded therewith. The liner is preferably formed of the same material as the bearing of the alternator assembly 10. The cup-shaped end portion 54 has receiving channels 74 for receiving retention flanges 88 formed in the brush holder housing 50.

8 Claims, 5 Drawing Sheets

BEARING RETAINER ASSEMBLY

TECHNICAL FIELD

The present invention relates generally to alternators, and more specifically, to a retainer assembly for supporting a bearing within an alternator housing.

BACKGROUND

Alternators have a rotor assembly with a shaft that is supported within a front and rear housing so that the rotor rotates with respect to a stator fixedly coupled within the housings. Typically, the rotor is positioned within the housing by a front bearing that couples to the front housing and a rear bearing that couples to the rear housing. Commonly, the front and rear bearings are press fit together so that the outer diameter of the bearing is held in place rotationally.

The housings of the alternator are commonly made from aluminum. The outer diameter of the bearings is formed of steel. Aluminum and steel expand at different rates when heated. Therefore, a press fit steel bearing into an aluminum housing is not sufficient to hold the bearing rotationally since the hole in the housing grows faster than the outer diameter of the bearing. One solution for this problem include incorporating plastic bands on the outer diameter of the bearing then press fitting the bearing into the aluminum housing. Another method for securing a bearing within a housing is adding a plastic sleeve between the housing and the bearing. Another method is to press the bearing into a steel sleeve that is attached to the aluminum housing. Each of these methods adds expense due to the additional components.

The rotor assembly has a field coil and claw pole fingers that generate a magnetic field. The field coil is energized by a pair of slip rings that are electrically connected to each end of the coil. The slip rings are commonly located on the outside of the housing. A brush holder is positioned on the outside of the housing whereby electrical contact between the brushes within the brush holder and the slip rings provide electrical power to the field coil.

Brushes are sensitive to contaminants. Commonly, a wall or extension may extend from the housing to partially protect the brushes. In such cases, however, the brushes are not completely sealed from the environment and therefore may become contaminated. Also, as the brush wears, carbon dust from the brushes may enter the housing and contaminate the stator and rotor and could potentially cause short circuits therein. Known brush protection does not address carbon dust contamination into consideration.

One consideration in alternator design is the overall size of the alternator package. Engine compartment space continues to be more compact and therefore reducing the size of the components including the alternator is desirable.

It is therefore desirable to provide an integral bearing assembly/brush retainer that prevents outside contamination of the brushes as well as prevents brush dust from contaminating the alternator in a small package.

SUMMARY OF THE INVENTION

It is therefore one object of the invention to provide an integral brush holder and bearing assembly that secures the brush assembly to the bearing assembly and is easy to assemble into the alternator package.

In one aspect of the invention, a bearing retainer assembly has a bearing retainer housing having a generally cup-shaped end portion and a coupling portion that couples the housing to the cover. A bearing retainer liner is positioned within the cup-shaped end portion and is sized to receive the bearing.

One feature of the invention is that the liner may be integrally molded with the retainer housing. A plurality of tabs formed in the end surface of the liner may be used to help retain the liner within the housing.

The bearing retainer assembly may also have a brush holder retaining portion that has a pair of receiving channels therein. A brush holder housing having retention flanges extending therefrom is sized to be received within the receiving channels. During the assembly process, brushes may be loaded into the brush holder housing. Then, the brush holder retention flanges are inserted within the receiving channels. A cap portion is sized to couple to the brush holder retaining portion and is sized to retain the brush holder together with the bearing retainer housing.

One advantage of the invention is that the bearing retainer assembly is a compact size. Another advantage of the invention is that both axial and rotational movement of the rotor is prevented with the bearing retainer assembly.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 5 is a bottom end view of a bearing retainer housing.

DESCRIPTION OF THE PREFERRED EMBODIMENT

Figure 1:
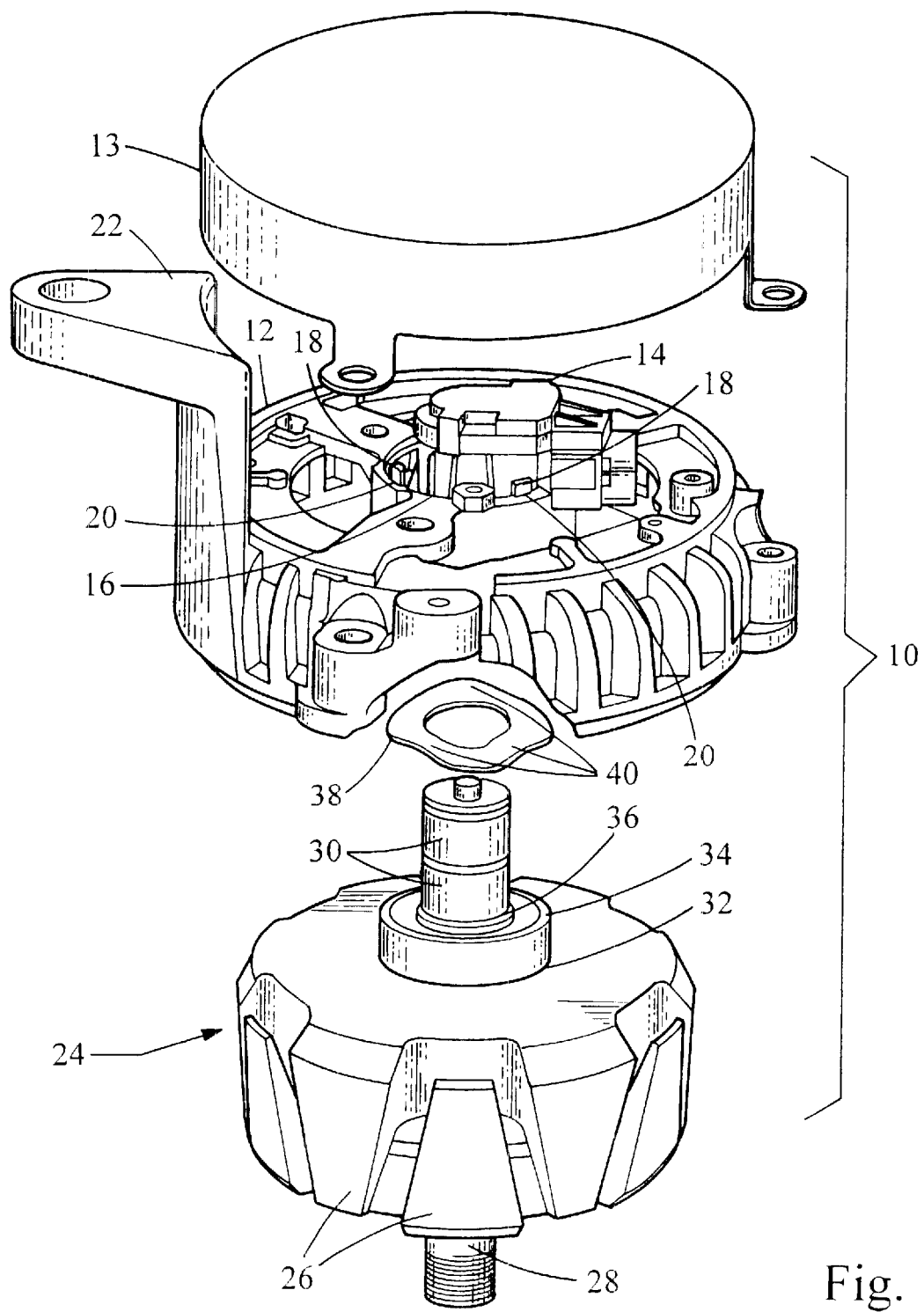
FIG. 1 is an exploded view of an alternator assembly having an integral brush holder and bearing retainer assembly according to the invention.
Figure 2:
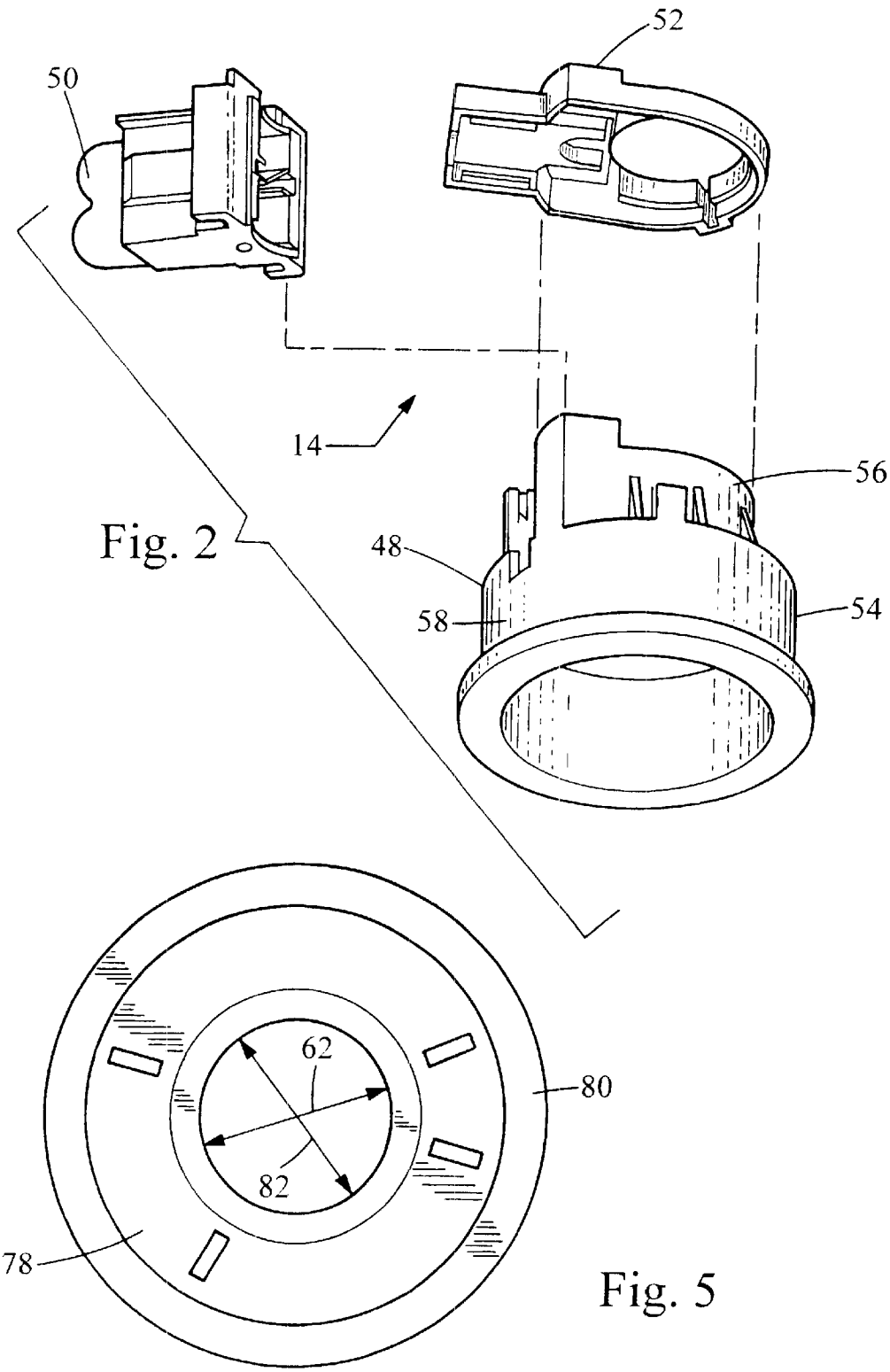
FIG. 2 is an exploded view of the brush holder and retainer assembly shown in FIG. 1.

In the following figures, the same reference numerals are used to identify identical components in the various views. The following description is provided with respect to an alternator. However, the present invention is applicable to other rotating electrical machines that have brushes and bearings.

Referring now to FIG. 1, a rotor assembly 10 is shown having a front cover 12 that has a brush holder and bearing retainer assembly 14 positioned within an opening 16 thereof. A outer cover 13 may be positioned on the end of front cover. Opening 16 has a diameter sized just large enough to receive brush holder and bearing assembly 14. Brush holder and bearing retainer assembly 14 have an interference fit within opening 16. However, to further retain the brush holder and bearing retainer assembly 14 within cover 12, brush holder and bearing retainer assembly 14 has heat stake tabs 18 positioned therearound. To perfect securing brush holder and bearing retainer assembly 14 within opening 16, heat stake tabs 18 are compressed in a conventional manner into recesses 20 on cover 12. Heat stake tabs 18 are thus deformed using heat to fit within recesses 20 during assembly.

As shown, cover 12 is a front cover of an alternator housing. A rear cover (not shown) is also used to enclose the alternator 10. Front cover 12 in combination with the rear cover (not shown), is used to position a rotor 20 therein. Rotor 20 rotates with respect to cover 12 and a stator (not shown) positioned within cover 12.

Brush holder and bearing retainer assembly 14 is used to position a rotor 24 with respect to cover 12. Rotor 24 has a plurality of claw poles 26 and a field core winding (not shown) positioned between the claw poles 26 and a shaft 28. The shaft 28 extends axially therethrough. Claw poles 26 are secured to the shaft 28. A pair of commutator rings 30 are positioned on shaft 28. Commutator rings 30 are electrically coupled to the field coil windings (not shown). Shaft 28 has a bearing 32 that is used to rotationally couple the rotor 20 within brush holder and bearing retainer assembly 14 and cover 12. Bearing 32 has an outer race 34 and an inner race 36 with ball bearings (not shown) positioned therebetween. Various types of bearing assemblies are known to those skilled in the art. Outer race 34 is formed of steel. Outer race 34 is fixedly positioned within brush holder and bearing retainer assembly 14. Inner race 36 is fixedly coupled onto shaft 28. Inner race 36 may also be formed of steel.

Figure 12:
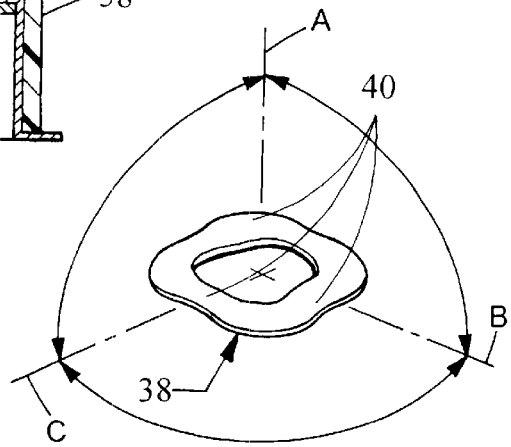
FIG. 12 is a perspective view of the wavy washer.

A wavy washer 38 may be positioned between bearing 32 and brush holder and bearing retainer assembly 14. Wavy washer 38 proves a spring like action so that when rotor 24 is assembled within bearing holder and bearing retainer assembly 14 axial movement is prevented. In one constructed embodiment, a wavy washer having three wave nodes 40 equally spaced thus, wavy washer 38 counteracts axial forces on rotor 24. Referring to FIG. 12, each of the wave nodes 40 are positioned 120 degrees apart, as shown by the axis A, B and C. Of course, other types of retention springs may be used to prevent axial movement.

Brush holder and bearing retainer assembly 14 has a bearing retainer housing 48, a brush holder housing 50 and a cap 52.

Figure 3:
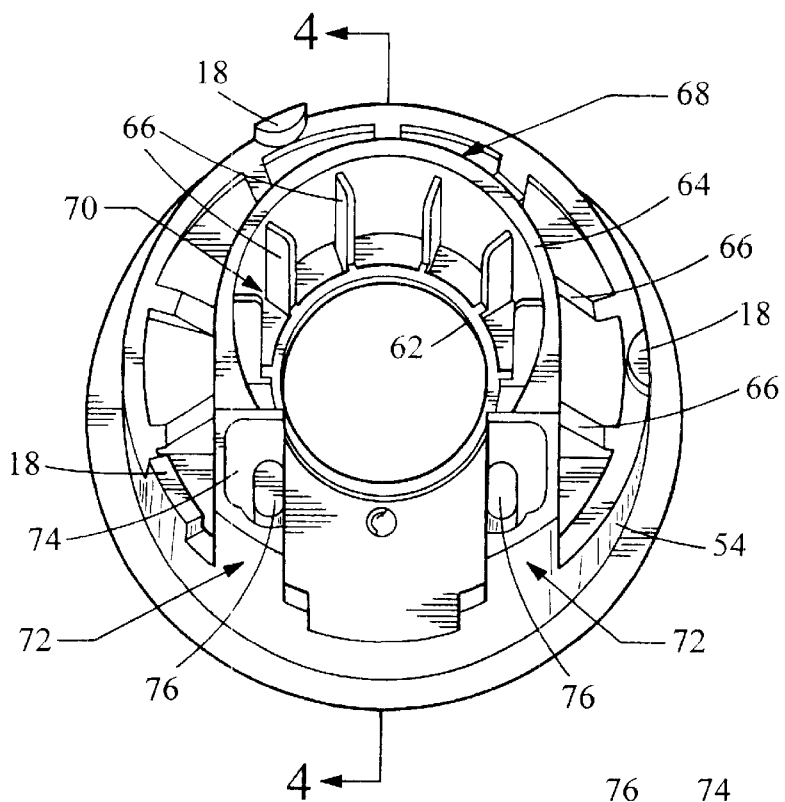
FIG. 3 is a top view of a bearing retainer housing.
Figure 4:
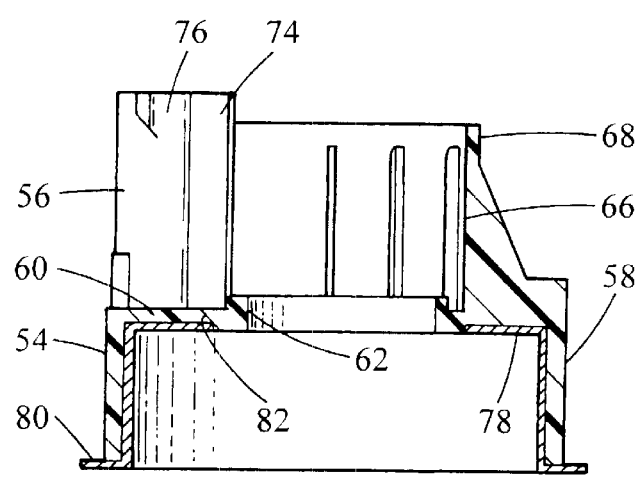
FIG. 4 is a cross-sectional view along line 4—4 of FIG. 3.

Referring to FIGS. 3, 4 and 5, bearing retainer housing 48 secures the bearing and brush holder housing 50 therein and cap 52 thereon. Bearing retainer housing 48 has a cup-shaped end portion 54 that receives bearing 32 and a brush holder retaining portion 56 that retains brush holder housing 50 therein. Brush holder retaining portion 56 extends through the cover 12 while cup-shaped end portion 54 is positioned with the cover 12.

Cup-shaped end portion 54 has cylindrical walls 58 and an end wall 60. End wall 60 forms the end of brush holder retaining portion 56. End wall 60 has an opening 62 therein so that rotor shaft 28 with commutator rings 30 extends therethrough so that commutator rings 30 are electrically coupled to the brushes of the brush holder housing 50.

During assembly, bearing retainer housing 48 is assembled into cover 12 prior to brush holder housing 50 and cap 52 being assembled thereon. Brush holder housing receives bearing 32 therein. Bearing retainer housing 48 receives brush holder housing 40 therein. That is, brush holder housing 50 is slidably attached within bearing retainer housing 48. Cap 52 snap fits to bearing retainer housing 48 to retain brush holder housing 50 therein.

Brush holder retaining portion 56 has an axially extending wall 64 that defines the outer periphery thereof. Wall 64 may have a plurality of reinforcement ribs 66 positioned within the interior and exterior thereof. Reinforcement ribs 66 increase the rigidity of the axially extending wall 64. Wall 64 has a generally circular portion 68 that is spaced apart from opening 62. That is, circular portion 68 has a diameter greater than opening 62. Circular portion 68 of wall 64 thus defines a brush dust collection area 70 therein. Brush dust collection area 70 receives the brush dust from the wearing brushes of the brush holder housing 50.

Wall 64 has a pair of retention portions 72 therein for retaining brush holder housing 50. Wall 64 defines a receiving channel 74 in each retention portion 72 for receiving brush holder housing 50. A pair of heat stake tabs 76 are formed adjacent to receiving channel 74. Heat stake tabs 76 are heated and deformed during assembly to fixedly couple brush holder housing therein. As shown, the portion of wall 64 defining receiving channel 74 and heat stake tab 76 may extend an axial direction greater than circular portion 68 of wall 64.

Cup-shaped end portion 54 has a generally cup-shaped liner 78 therein. Liner 78 is preferably formed of steel or the same material as the outer race 34 of bearing 32. This allows the coefficients of thermal expansion to be the same and prevent relative movement of the outer race 34 during various thermal cycles with respect to liner 78.

As illustrated, liner 78 may have a flange 80 extending therefrom around the end of cylindrical wall 58. Flange 80 helps prevent brush holder and bearing retainer assembly 54 from moving axially outward during operation of alternator 10. Liner 78, as will be further described below, is preferably integrally formed with cylindrical wall 58. Liner 78 has an opening 82 that is preferably just larger than opening 62.

Figure 6:
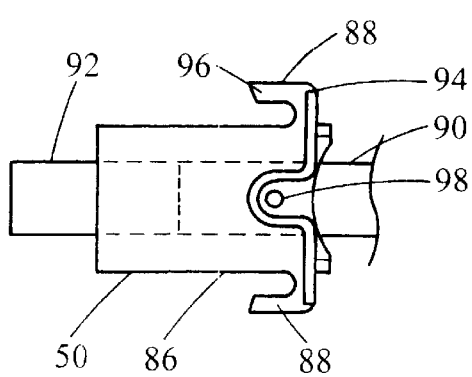
FIG. 6 is a top view of a brush holder housing according to the present invention.

Referring now to FIG. 6, a top view of brush holder housing 50 is illustrated. Brush holder housing 50 has a main body portion 86 with retention flanges 88 extending therefrom. Main body portion 86 is used to receive brushes 90 shown in phantom lines within brush channels 91. Preferably, two brushes 90 are used. Main body portion 86 may also have a connector portion 82 extending from the end opposite of brushes 90. Connector portion 92 may be used to form electrical connections with the power source for the brushes.

As illustrated, retention flanges 88 have a laterally extending portion 94 and a longitudinally extending portion 96. Retention flanges 88 are generally L-shaped. Preferably, retention flanges 88 extend a substantial portion, if not the full portion, of receiving channels 74.

A retainer hole 98 may also be formed through main body portion 86 of brush holder housing 50. Brushes 90 are loaded into brush holder housing 50 prior to assembly. Because the brushes 90 are spring biased outward, a retainer pin is received within retainer hole 98 and is removed after the rotor has been inserted within brush holder and bearing retainer assembly 14. This allows brushes 90 to electrically contact commutator rings 30.

Figure 7:
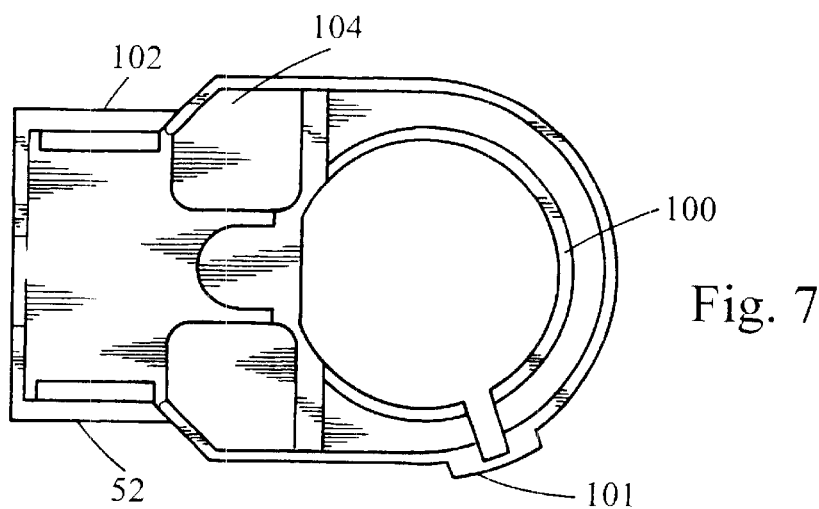
FIG. 7 is a bottom (inside) view of a cap.

Referring now to FIG. 7, cap 52 is illustrated. Cap 52 is shaped to snap fit to bearing retainer housing 48 and brush holder housing 50. Cap 52 has a circular retention channel 100 for receiving circular portion 68 of wall 64. Wall 64 in combination with cap is used to enclose brush dust collection area 70 shown above.

Cap 52 has a brush holder cover portion 102 that extends over main body portion 86 of brush holder housing 50. Cap also has a pair of retention portion channels 104 for receiving retention portion 72.

Cap 52 has a drainage channel 101 defined therein. Drainage channel 101 allows any fluid collected within brush dust collection area 70 to drain out.

Figure 8:
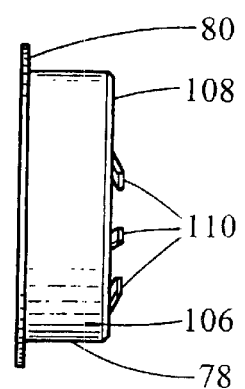
FIG. 8 is a side view of a liner portion prior to assembly within the bearing retainer housing.
Figure 9:
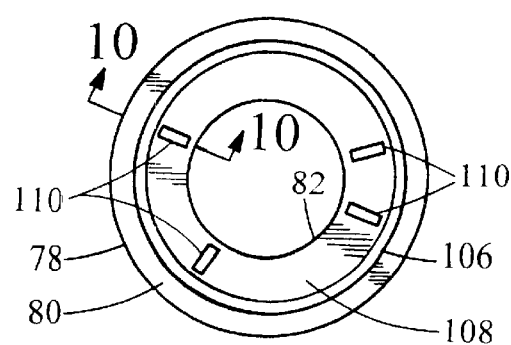
FIG. 9 is a top view of a bearing retainer liner.
Figure 10:
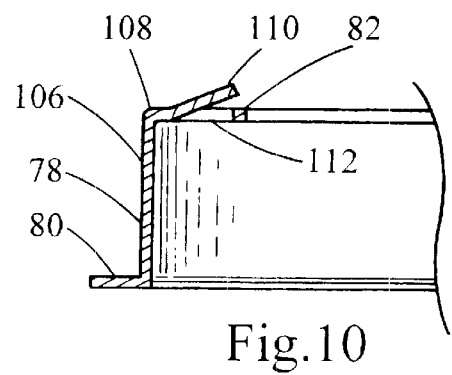
FIG. 10 is a side view of a bearing liner.

Referring now to FIGS. 8, 9 and 10, various views of liner 78 are shown. Liner 78 has a flange portion 80 as described above and a cylindrical wall portion 106 and an end portion 108. Thus, defining the end of the generally cup shape.

End portion 108 has a plurality of tabs 110 formed therein. Tabs 110 may be formed by stamping or other suitable process. Tabs 110 thus have a port that remains fixed to end portion 108 and a second end that extends in an axial direction from end portion 108. When tabs 110 are formed, holes 112 are formed in end portion 108.

Figure 11:
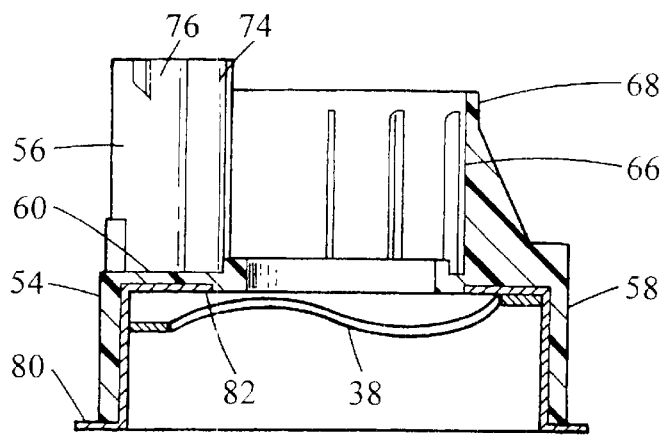
FIG. 11 is a cross sectional view similar to FIG. 4 showing the wavy washer positioned within the bearing liner.
Figure 13:
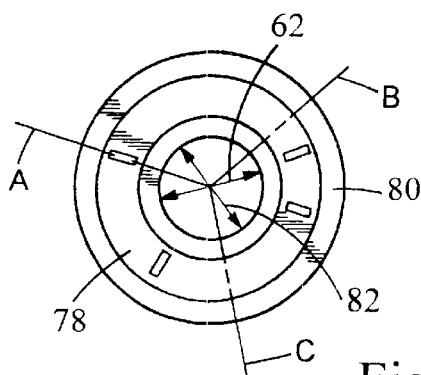
FIGS. 13–16 are top views of the bearing retainer housing showing the tab locations and how the wave nodes line up with the tab locations.
Figure 14:
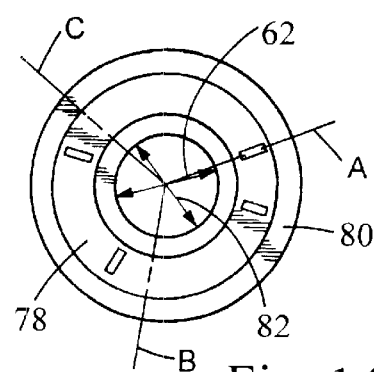
Figure 15:
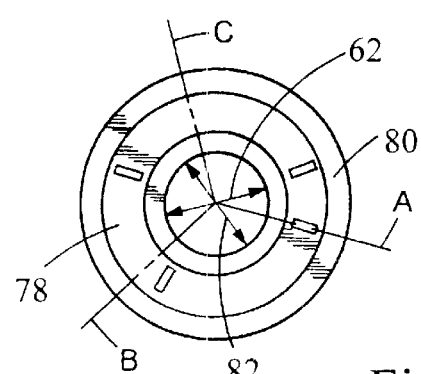
Figure 16:
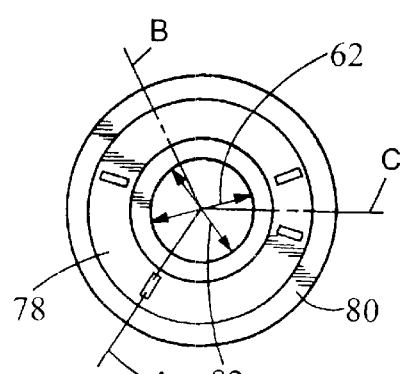

Preferably, tabs 110 are unevenly spaced around end portion 108. As described above, a wavy washer 38 fits against end portion 108. Tabs 110 are positioned so that no more than one wave node 40 may contact a hole 112 to prevent wear. However, in most situations, wavy washer 38 will not move during the alternator operation. Specifically, no two holes 112 are exactly 120 degrees apart radially, therefore, no more than one of the wave nodes 40, which are exactly 120 degrees apart, will be aligned with a hole 112 for any given position of the wavy washer 38. The wavy washer 38 fits within the bearing liner 80, as shown in FIG. 11. Referring to FIGS. 13–16, all the possible locations for the wave nodes are shown where at most one wave node 40 is aligned with one of the holes 112. Referring to FIG. 13, when an axis A of the first wave node 40 is aligned with a first of the four shown hole 112 locations, it is apparent that neither of the remaining wave nodes, B and C, are aligned with any of the remaining three hole 112 locations. Referring to FIGS. 14, 15 and 16, it is apparent that this is the case when the first wave node A is located aligned with any of the other three hole 112 locations as well.

In operation, the alternator assembly 10 is assembled by first forming the bearing retainer housing 48 with liner 78 therein. Preferably, liner 78 is integrally molded with bearing retainer housing as described above. The bearing retainer housing is inserted within the opening 16 of the alternator cover 12 so that heat stake tabs 18 align with recesses 20. Heat stake tabs 18 may at this point be heat staked to cover 12. The heat staking may also take place later in the assembly. The preassembled rotor 24 is placed into the opening 62 of bearing retainer housing 48 so that the commutator rings 30 extend into the brush holder retaining portion 56 and so that bearing 32 extends into the cup-shaped end portion 54. The bearing 32 is securely coupled by pressing the bearing into the liner 78.

Brush holder housing 50 with its retention flanges are preferably preloaded with carbon brushes 90. The retention flanges 88 are placed within receiving channel 74 in an axial direction. If a retainer is used, the retainer is removed from retaining hole 98 to release the brushes so that the brushes contact commutator rings 30. The heat stake tabs 76 are deformed by heat staking to retain the brush holder housing 50 into the retention portions 72.

Cap 52 is snap fit onto the wall 64 and engaged with retention portion 72. An outer cover 13 may also be secured to cover 12 so that any other components therein are protected. Cover 13 may also be used to prevent cap 52 from separating from the bearing retainer housing 48.

While particular embodiments of the invention have been shown and described, numerous variations and alternate embodiments will occur to those skilled in the art. Accordingly, it is intended that the invention be limited only in terms of the appended claims.

What is claimed is:

1. A bearing retainer assembly for a rotating electrical machine having a cover, and a rotor with a bearing coupled thereto, comprising:

a bearing retainer housing having a generally cup-shaped end portion and a coupling portion coupling said housing to said cover;

a cylindrical bearing retainer liner having an end wall and being positioned within said cup-shaped end portion is sized to receive the bearing and a wavy washer therein, said wavy washer having a plurality of wave nodes extending laterally therefrom;

said end wall having a plurality of tabs extending into said bearing retainer housing, said tabs adapted to secure said liner within said bearing retainer housing and being positioned so that at most one wave node may be positioned adjacent to one of said tabs; and a brush holder retaining portion having a pair of receiving channels adapted to receive and secure a brush holder housing.

2. A bearing retainer assembly as recited in claim 1 wherein said brush holder housing includes retention flanges sized to be received within said receiving channels.

3. A bearing retainer assembly as recited in claim 1 further comprising a cap coupled to said brush holder retaining portion.

4. A bearing retainer assembly as recited in claim 1 wherein said liner is integrally formed with said bearing retainer housing.

5. A bearing retainer assembly as recited in claim 1 wherein said liner is formed of substantially a same material as said bearing.

6. A bearing retainer assembly as recited in claim 5 wherein said material comprises steel.

7. An alternator assembly comprising:

a rotor assembly comprising pole fingers, a shaft, and a bearing coupled to said shaft, said bearing having an outer diameter;

a housing cover having an opening therein;

a bearing retainer brush holder assembly having an outside dimension sized to be received within said opening, said bearing retainer brush holder assembly having a bearing retainer housing having a generally cup-shaped end portion having a bearing retainer liner therein, said bearing liner being cylindrical in shape, having an end wall and being sized to receive said bearing and a wavy washer therein, and a brush holder retaining portion, said brush holder retaining portion having a pair of receiving channels adapted to receive and secure a brush holder housing;

said end wall having a plurality of tabs extending into said bearing retainer housing, said tabs being adapted to secure said liner within said bearing retainer housing, and said wavy washer having a plurality of wave nodes extending laterally therefrom, said tabs positioned so that at most one wave node may be positioned adjacent to one of said tabs;

said brush holder housing having retention flanges extending therefrom, said flanges sized to be received within said receiving channels; and a cap portion sized to be received on said brush holder retaining portion.

8. An alternator assembly as recited in claim 7 further comprising an end cover and positioned to retain said cap on said brush holder retaining portion.

* * * * *